United States Patent [19]

Bauer et al.

[11] 4,041,397
[45] Aug. 9, 1977

[54] SATELLITE UP LINK DIVERSITY SWITCH

[75] Inventors: Peter W. Bauer; Merle R. Paulson, both of San Diego, Calif.

[73] Assignee: The United States of America as represented by the Secretary of the Navy, Washington, D.C.

[21] Appl. No.: 680,840

[22] Filed: Apr. 28, 1976

[51] Int. Cl.² .............................................. H04B 7/20
[52] U.S. Cl. ........................................ 325/304; 325/4; 325/370; 325/55; 343/725; 343/742
[58] Field of Search .................... 325/304, 56, 370, 55, 325/302; 343/725, 742, 777

[56] References Cited
U.S. PATENT DOCUMENTS

| | | | |
|---|---|---|---|
| 2,573,912 | 10/1951 | Bucher | 325/304 |
| 3,095,538 | 6/1963 | Silverstein | 325/304 |
| 3,155,909 | 11/1964 | Shepherd | 325/304 |
| 3,403,341 | 9/1968 | Munch | 325/340 |
| 3,476,922 | 11/1969 | Yiotis | 325/304 |
| 3,537,011 | 10/1970 | Escoula | 325/370 |
| 3,928,804 | 12/1975 | Schmidt et al. | 325/370 |

Primary Examiner—Benedict V. Safourek
Assistant Examiner—Tommy P. Chin
Attorney, Agent, or Firm—R. S. Sciascia; G. J. Rubens; T. M. Phillips

[57] ABSTRACT

A satellite up link diversity switch system. A beacon or reference signal is received from the satellite at two locations separated in an east-west direction. Diversity logic compares the two signals received and switches the output of a UHF transmitter to whichever antenna is receiving the stronger signal at the time.

1 Claim, 2 Drawing Figures

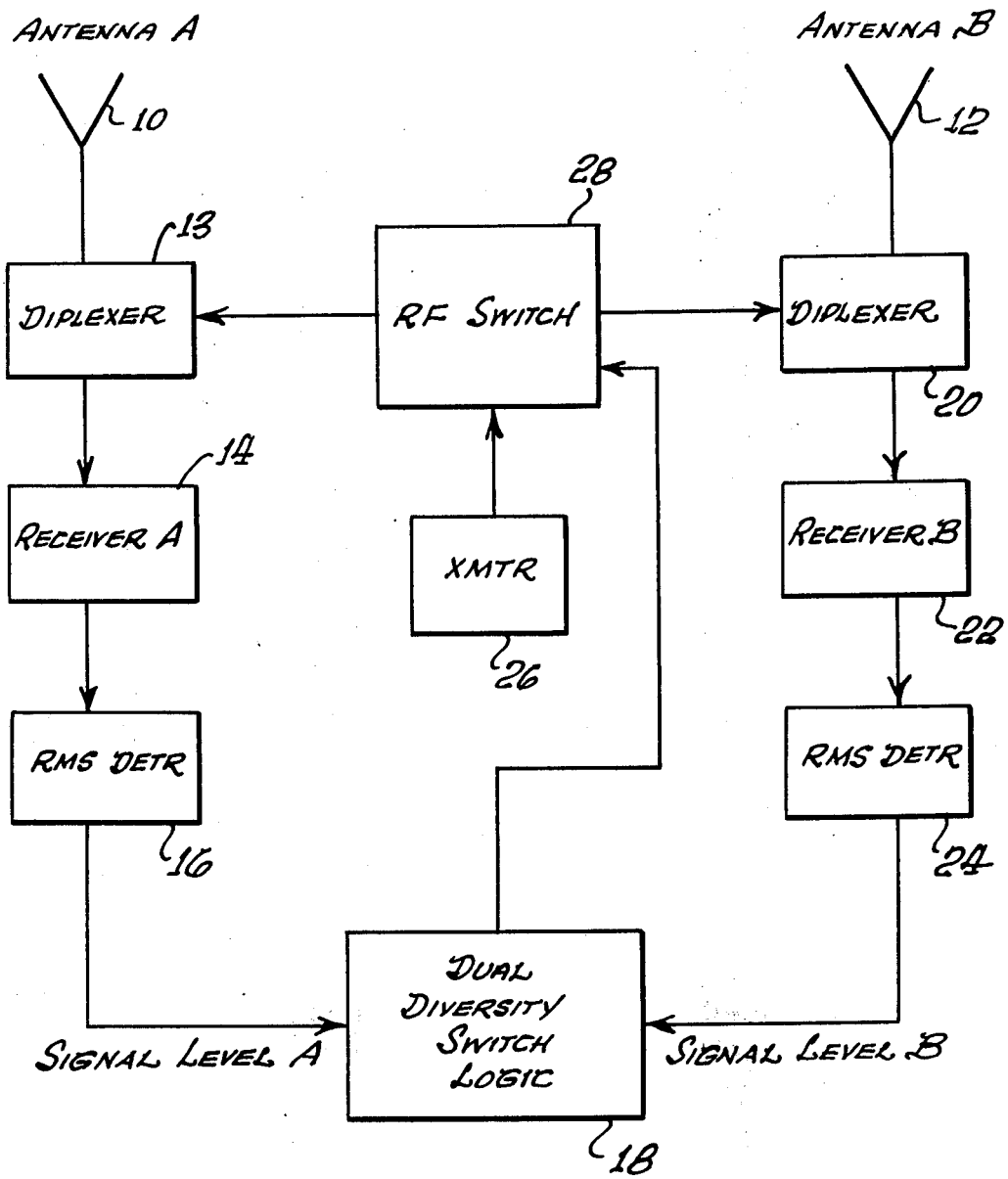

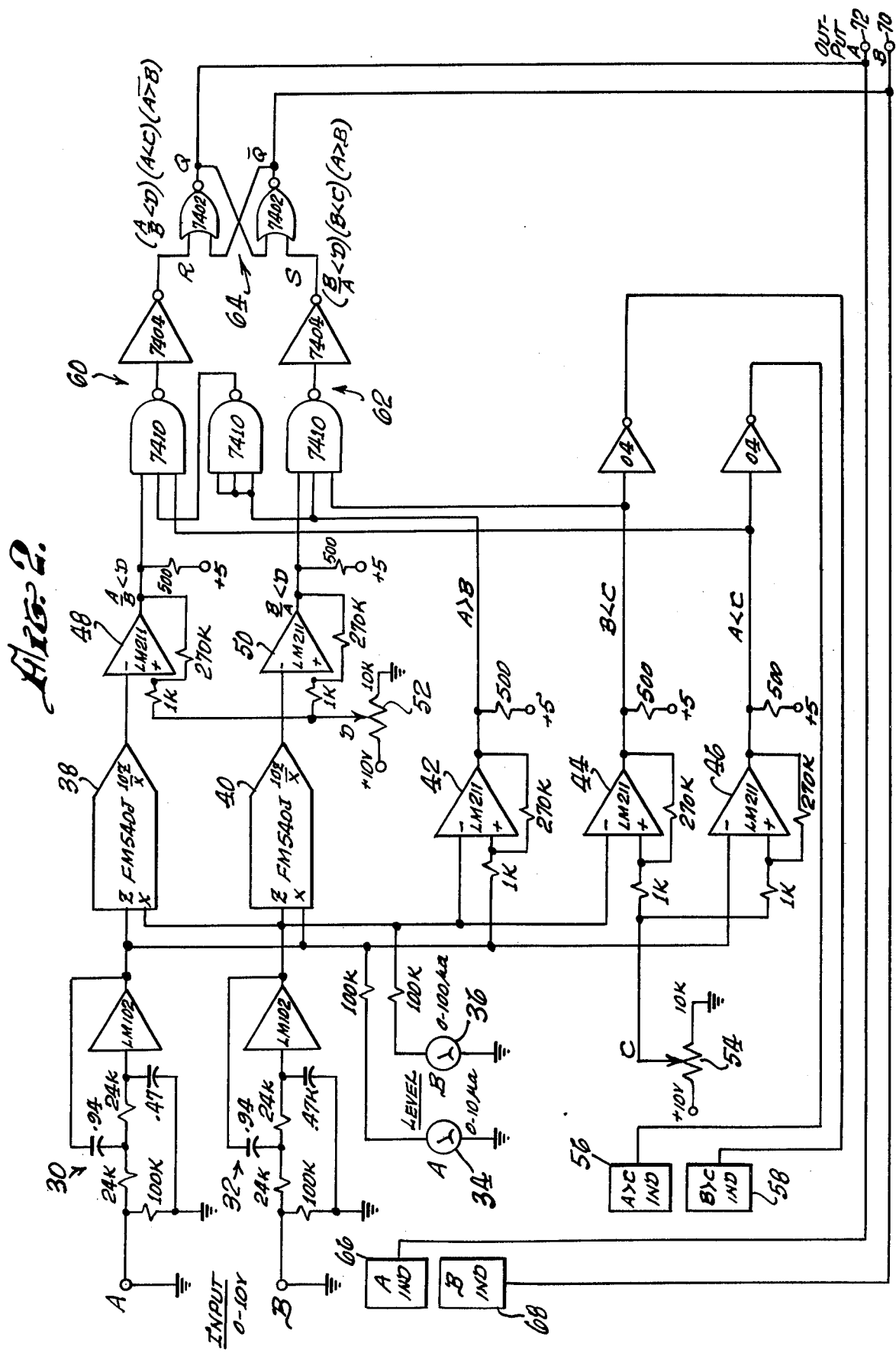

SATELLITE UP LINK DIVERSITY SWITCH

BACKGROUND OF THE INVENTION

The present invention relates to satellite communications and more particularly to a satellite up link diversity switch for minimizing fading and scintillation which are presently a problem on UHF satellite up links, especially at the magnetic equator.

SUMMARY OF THE INVENTION

The present invention provides for a switching system to select one of two antennas for transmitting at the ground terminal to maximize the signal received at the satellite based upon a beacon signal from that satellite. A system is provided having two antennas located or positioned in separate locations in an east-west direction. A beacon or reference signal transmitted from the satellite is received at the two locations. A diversity logic circuit compares the two signal levels received and switches the output of a UHF transmitter to whichever antenna is receiving the stronger signal as determined by the logic circuitry.

Accordingly, an object of the present invention is the provision of a switching system to select one of two antennas for transmitting at the ground terminal to maximize the signal received at the satellite based upon a beacon signal from the satellite.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 1 is a block diagram of the satellite up link diversity switch system;

FIG. 2 is a schematic diagram of the control logic used in the system of FIG. 1.

DESCRIPTION OF THE PREFERRED EMBODIMENT

Referring now to FIG. 1 wherein there is shown two receiving and transmitting antennas 10 and 12 located at positions A and B, respectively, in an east-west direction. A beacon signal transmitted from a satellite (not shown) is received by both antennas 10 and 12. The signal received by antenna 10 is fed through diplexer 13 to receiver 14. The output signal from receiver 14 is detected in RMS detector 16 and fed as a first input to the dual diversity switch logic 18.

The signal received at antenna 12 is fed through diplexer 20 to receiver 22. The output signal from receiver 22 is detected in RMS detector 24 and fed as a second input to diversity switch logic 18.

Logic circuit 18 compares the two signal levels and provides output signals to RF switch 28 for controlling the switching of the output signal from transmitter 26 to either antenna 10 or antenna 12 depending on which antenna is receiving the stronger signsl at the time.

Referring to FIG. 2 wherein there is shown in schematic diagram form the logic circuit for providing the switching signals to RF switch 28 of FIG. 1. The output signals from RMS detectors 16 and 24 are the input signals A and B, respectively. Input signals A and B are simultaneously coupled to and passed through 10Hz low pass two pole active filters 30 and 32, respectively. Filter circuits 30 and 32 are built around an LM 102 voltage follower. These filters provide unity gain, with 100K ohm input impedance, 10Hz bandwidth and a low output impedance.

The output from filter circuit 30 is fed as the Z input to divider circuit 38, the X input to divider circuit 40, the positive input terminal of comparator 42, the negative input terminal of comparator 46 and to channel level meter 34. The output from filter circuit 32 is fed to the X input terminal of divider 38, the Z input terminal of divider circuit 40, the negative input terminal of comparator 42, channel level meter 36 and the negative input terminals of comparators 42 and 44.

The outputs of dividers 38 and 40 are 10 Z/X so that for A/B ≦ 1 the output of divider 38 is ≦ 10 volts and for B/A ≦ 1 the output of divider 40 is ≦ 10 volts. The normal output voltage range of each of the dividers is 0.1 to 10 volts corresponding to a divide range of 100:1.

The output from divider 38 is fed to the negative input of comparator circuit 48 while the output from divider 40 is fed to the negative input of comparator circuit 50. The positive inputs of comparators 48 and 50 are fed to the movable arm of a ratio potentiometer 52. The output of each of dividers 38 and 40 is compared to the fixed voltage from ratio potentiometer 52 and provides a logic 1 output for (A/B<D) at the output of comparator 48 and a logic 1 output for (B/A<D) at the output of comparator 50.

Comparator 46 has as its inputs the output signal from filter circuit 30 and a fixed voltage from potentiometer 54. The pickoff voltage from potentiometer 54 is also applied to the input of comparator 44. Comparator 46 compares the A signal level with the fixed voltage provided by the inhibit potentiometer 54 while comparator 44 compares the B signal level with the same fixed voltage. Logic 1 outputs are produced at the output of comparator 46 for (A<C) and a logic 1 output from comparator 44 for (B<C). Comparator 42 compares the A and B signal levels and provides a logic 1 output for A<B. It is desirable for all comparators to have a 1:270 positive feedback network to introduce approximately 40 millivolts hysteresis to prevent oscillation near the switching point.

LED indicators 56 and 58 are provided for indicating respectively when signal A is < signal C and signal B is < signal C, i.e., when the inhibit level is exceeded. Indicators 56 and 58 provide a convenient means for observing the inhibit level during dynamic operation since the Channel level meters 34 and 36 response is less than 1Hz.

The outputs of all five comparators are fed into two three input AND gates 60 and 62. Each of AND gates 60 and 62 include a NAND gate 7410 and an inverter 7404. The output from AND gate 60 is (A/B < D) (A < C) ($\overline{A > B}$). This means the output of AND gate 60 will go high only if the ratio of the signal level A to signal level B is less than the voltage signal D set on the ratio control 52 (this implies signal B level is greater than signal A level), the A signal is less than the voltage C set on the inhibit control 54, and signal level B is greater than signal level A. This condition causes the R terminal of the RS latch 64 to go high making terminal Q high which drives the channel B output high at output terminal 70. All three conditions must be met simultaneously for the B output terminal to go high. RS latch 64 will remain in the high position until the S terminal is made to go high.

For the A output terminal 72 to go high the ratio of B to A must be less than the ratio control voltage D (this implies that signal A level is greater than signal B level), the level of signal B is less than the inhibit voltage C, and the signal A level greater than the signal B level, or in logic notation when (B/A < D) (B < C) (A < B) occurs simultaneously. The signals to the RS latch 64 are:

R = (A/B < D) (A < C) $(\overline{A > B})$ selects B output high

S = (B/A < D) (B < C) (A > B) selects A output high

The A > B comparator 42 is provided to inhibit switching caused on the S output from AND gate 62 when $\overline{A > B}$ and on the R output line from AND gate 60 when A > B by the divider 38 which, instead of approaching zero volts output, produces a large negative spike under some conditions.

LED indicator 66 and 68 are provided for indicating which channel has been selected.

Obviously many modifications and variations of the present invention are possible in the light of the above teachings. It is therefore to be understood that within the scope of the appended claims the invention may be practiced otherwise than as specifically described.

What is claimed is:

1. A system for maximizing the signal received at a satellite terminal transmitted from a ground station comprising:
    a. plurality of antenna means associated with said ground station for receiving a beacon signal from the satellite terminal and for transmitting signals to the satellite terminal,
    b. logic circuitry for comparing the levels of said received beacon signals comprising,
        1. first circuit means for providing an output signal when the ratio of the beacon signal level received at a first antenna to the beacon signal level received at a second antenna is less than a reference voltage,
        2. second circuit means for providing an output signal when the ratio of the beacon signal level received at the second antenna to the beacon signal level received at the first antenna is less than said reference voltage,
        3. third circuit means for providing an output signal when the beacon signal level received at said first antenna is greater than the beacon signal level received at said second antenna,
        4. fourth circuit means for providing an output signal when the beacon signal level received at said first antenna is less than a predetermined reference voltage,
        5. fifth circuit means for providing an output signal when the beacon signal level received at said second antenna is less than said predetermined reference voltage,
        first AND gate circuit means having a first input coupled to said first circuit means, a second input coupled to said third circuit means and a third input coupled to said fourth circuit means for providing a high output switching signal when signals are present at all three inputs simultaneously,
        second AND gate circuit means having a first input coupled to said second circuit means, a second imput coupled to said third circuit means and a third input coupled to said fifth circuit means for providing a second high output switching signal when signals are present at all three inputs simultaneously,
    c. an RF transmitter;
    d. an RF switch coupled to said RF transmitter, said plurality of antenna means, and to said logic circuitry and being responsive to the output switching signal for connecting the RF transmitter to the antenna means receiving the strongest beacon signal.

* * * * *